(12) United States Patent
Moyer

(10) Patent No.: US 8,356,239 B2
(45) Date of Patent: Jan. 15, 2013

(54) SELECTIVE CACHE WAY MIRRORING

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1091 days.

(21) Appl. No.: 12/204,989

(22) Filed: Sep. 5, 2008

(65) Prior Publication Data

US 2010/0064205 A1    Mar. 11, 2010

(51) Int. Cl.
G06F 11/00    (2006.01)
(52) U.S. Cl. ........................................... 714/800
(58) Field of Classification Search ............ 714/799, 714/800, 819; 711/118
See application file for complete search history.

(56) References Cited

U.S. PATENT DOCUMENTS

| | | | |
|---|---|---|---|
| 5,479,641 A | 12/1995 | Nadir et al. | |
| 5,488,691 A | 1/1996 | Fuoco et al. | |
| 5,630,055 A | 5/1997 | Bannon et al. | |
| 5,761,705 A * | 6/1998 | DeKoning et al. | 711/113 |
| 5,875,201 A | 2/1999 | Bauman et al. | |
| 5,958,068 A | 9/1999 | Arimilli et al. | |
| 5,961,660 A | 10/1999 | Capps, Jr. et al. | |
| 6,092,182 A | 7/2000 | Mahalingaiah | |
| 6,567,952 B1 | 5/2003 | Quach et al. | |
| 6,571,317 B2 | 5/2003 | Supnet | |
| 6,654,925 B1 | 11/2003 | Meaney et al. | |
| 6,804,763 B1 | 10/2004 | Stockdale et al. | |
| 6,804,799 B2 | 10/2004 | Zuraski, Jr. | |
| 6,898,738 B2 | 5/2005 | Ryan et al. | |
| 7,124,170 B1 | 10/2006 | Sibert | |
| 7,254,748 B1 | 8/2007 | Wright et al. | |
| 7,310,709 B1 | 12/2007 | Aingaran et al. | |
| 7,366,829 B1 | 4/2008 | Luttrell et al. | |
| 7,430,145 B2 | 9/2008 | Weiss et al. | |
| 7,461,321 B2 | 12/2008 | Lesartre | |
| 2003/0018936 A1 * | 1/2003 | Ryan et al. | 714/723 |
| 2003/0084369 A1 | 5/2003 | Kane et al. | |
| 2003/0131277 A1 | 7/2003 | Taylor et al. | |

(Continued)

FOREIGN PATENT DOCUMENTS

EP    0418457 B1    1/1997

OTHER PUBLICATIONS

Office Action mailed Nov. 2, 2011 in U.S. Appl. No. 12/205,222.

(Continued)

*Primary Examiner* — Scott Baderman
*Assistant Examiner* — Yair Leibovich
(74) *Attorney, Agent, or Firm* — Joanna G. Chiu

(57) ABSTRACT

A data processing system has cache circuitry having a plurality of ways. Mirroring control logic indicates a mirrored way pair and a non-mirrored way of the plurality of ways. The mirrored way pair has first and second ways wherein the second way is configured to store cache data fields redundant to cache data fields of the first way. In one form, comparison logic, in response to an address hitting in the first way or the second way within the mirrored way pair, performs a bit comparison between cache data from the first way addressed by an index portion of the address with cache data from the second way addressed by the index portion of the address to provide a bit parity error signal. In another form, allocation logic uses a portion of the address and line locking information to determine whether a mirrored or non-mirrored way is selected for allocation.

23 Claims, 10 Drawing Sheets

U.S. PATENT DOCUMENTS

| | | |
|---|---|---|
| 2005/0132263 A1 | 6/2005 | Anderson et al. |
| 2007/0044004 A1 | 2/2007 | Hino et al. |
| 2008/0140962 A1 | 6/2008 | Pattabiraman et al. |
| 2009/0150720 A1* | 6/2009 | Rafaeli et al. ............. 714/6 |

OTHER PUBLICATIONS

PCT/US2009/048772 International Search Report and Written Opinion mailed Dec. 31, 2009 in application corresponding to Related U.S. Appl. No. 12/205,210.

MPC7450 RISC Microprocessor Family Reference Manual Rev.5, Programming Environments Manual, Jan. 2005, Cover Page, Information Page, Table of Contents and Chapter 3 (pp. 3-1 thru 3-101), Freescale Semiconductor, Inc.

U.S. Appl. No. 12/112,580, filed Apr. 30, 2008.

U.S. Appl. No. 12/205,222, Moyer et al., "Error Detection Schemes for a Cache in a Data Processing System", filed Sep. 5, 2008—Office Action—Notice of Allowance—mailed Jun. 13, 2012.

* cited by examiner

FIG. 4

| WAY 0 ALLOCATION CONTROL | WAY 1 ALLOCATION CONTROL | WAY 2 ALLOCATION CONTROL | WAY 3 ALLOCATION CONTROL | WAY 4 ALLOCATION CONTROL | WAY 5 ALLOCATION CONTROL | WAY 6 ALLOCATION CONTROL | WAY 7 ALLOCATION CONTROL |
|---|---|---|---|---|---|---|---|
| 0 1 | 2 3 | 4 5 | 6 7 | 8 9 | 10 11 | 12 13 | 14 15 |

| BITS | NAME | DESCRIPTION |
|---|---|---|
| 0:1 | WAY 0 ALLOCATION CONTROL | WAY 0 ALLOCATION CONTROL.<br>00 = RESERVED<br>01 = THE CORRESPONDING WAY (0) IS AVAILABLE FOR REPLACEMENT BY INSTRUCTION MISS LINE FILLS.<br>10 = THE CORRESPONDING WAY (0) IS AVAILABLE FOR REPLACEMENT BY DATA MISS LINE FILLS.<br>11 = THE CORRESPONDING WAY (0) IS AVAILABLE FOR REPLACEMENT BY DATA OR INSTRUCTION MISS LINE FILLS. |
| ... | ... | ... |
| 14:15 | WAY 7 ALLOCATION CONTROL | WAY 7 ALLOCATION CONTROL.<br>00 = RESERVED<br>01 = THE CORRESPONDING WAY (7) IS AVAILABLE FOR REPLACEMENT BY INSTRUCTION MISS LINE FILLS.<br>10 = THE CORRESPONDING WAY (7) IS AVAILABLE FOR REPLACEMENT BY DATA MISS LINE FILLS.<br>11 = THE CORRESPONDING WAY (7) IS AVAILABLE FOR REPLACEMENT BY DATA OR INSTRUCTION MISS LINE FILLS. |

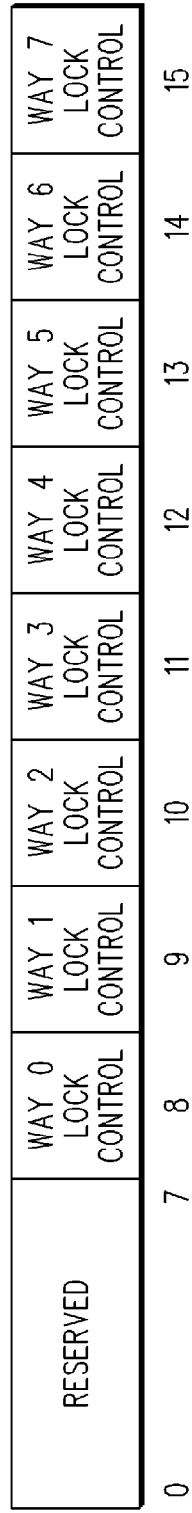

FIG. 6

| REGISTER 51 → RESERVED | WAY 0 LOCK CONTROL | WAY 1 LOCK CONTROL | WAY 2 LOCK CONTROL | WAY 3 LOCK CONTROL | WAY 4 LOCK CONTROL | WAY 5 LOCK CONTROL | WAY 6 LOCK CONTROL | WAY 7 LOCK CONTROL |
|---|---|---|---|---|---|---|---|---|
| 0　　　　　　　7 | 8 | 9 | 10 | 11 | 12 | 13 | 14 | 15 |

FIG. 7

| BITS | NAME | DESCRIPTION |
|---|---|---|
| 0:7 | RESERVED | — |
| 8 | WAY 0 LOCK CONTROL | WAY 0 LOCK CONTROL<br>0 = WAY 0 NOT LOCKED<br>1 = WAY 0 LOCKED; NO ALLOCATION OCCURS TO WAY 0 ON CACHE MISS |
| ... | ... | ... |
| 15 | WAY 7 LOCK CONTROL | WAY 7 LOCK CONTROL<br>0 = WAY 7 NOT LOCKED<br>1 = WAY 7 LOCKED; NO ALLOCATION OCCURS TO WAY 7 ON CACHE MISS |

WITHIN MIRRORING
CONTROL LOGIC 50

| RESERVED | WAY 0/WAY 1 MIRRORING CONTROL | WAY 2/WAY 3 MIRRORING CONTROL | WAY 4/WAY 5 MIRRORING CONTROL | WAY 6/WAY 7 MIRRORING CONTROL |
|---|---|---|---|---|
| 0            11 | 12 | 13 | 14 | 15 |

FIG. 8

| BITS | NAME | DESCRIPTION |
|---|---|---|
| 0:11 | RESERVED | — |
| 12 | WAY 0/WAY 1 MIRRORING CONTROL | WAY 0/1 MIRRORING CONTROL<br>0 = WAYS 0 AND 1 ARE NOT MIRRORED<br>1 = WAYS 0 AND 1 ARE MIRRORED |
| ... | ... | ... |
| 15 | WAY 6/WAY 7 MIRRORING CONTROL | WAY 6/7 MIRRORING CONTROL<br>0 = WAYS 6 AND 7 ARE NOT MIRRORED<br>1 = WAYS 6 AND 7 ARE MIRRORED |

FIG. 9

WITHIN MIRRORING
CONTROL LOGIC 50

| RESERVED | WAY 0/WAY 1 LOCK MIRRORING CONTROL | WAY 2/WAY 3 LOCK MIRRORING CONTROL | WAY 4/WAY 5 LOCK MIRRORING CONTROL | WAY 6/WAY 7 LOCK MIRRORING CONTROL |
|---|---|---|---|---|
| 0        11 | 12 | 13 | 14 | 15 |

*FIG. 10*

| BITS | NAME | DESCRIPTION |
|---|---|---|
| 0:11 | RESERVED | — |
| 12 | WAY 0/WAY 1 LOCK MIRRORING CONTROL | WAY 0/1 MIRRORING CONTROL<br>0 = WAYS 0 AND 1 ARE NOT AVAILABLE FOR LINE LOCK MIRRORING<br>1 = WAYS 0 AND 1 ARE AVAILABLE FOR LINE LOCK MIRRORING |
| ... | ... | ... |
| 15 | WAY 6/WAY 7 LOCK MIRRORING CONTROL | WAY 6/7 MIRRORING CONTROL<br>0 = WAYS 6 AND 7 ARE NOT AVAILABLE FOR LINE LOCK MIRRORING<br>1 = WAYS 6 AND 7 ARE AVAILABLE FOR LINE LOCK MIRRORING |

*FIG. 11*

SELECTIVE CACHE WAY MIRRORING

BACKGROUND

1. Field

This disclosure relates generally to semiconductors, and more specifically, to storage circuits that are cache memories for processors.

2. Related Art

Lower power consumption continues to have importance in data processing systems, due, for example, to widespread use of portable and handheld applications. Most data processing systems today use a smaller, faster, and more efficient memory, referred to as a cache, located on the integrated circuit to reduce the number of accesses to memory (such as main memory or other internal or external memories). It is well known that accesses to cache generally consume less power and result in reduced latencies as compared to accesses to other internal or external memories. Therefore, it is desirable to store those items which will subsequently be requested again in the faster, more efficient cache in order to reduce power and increase performance.

Cache pollution occurs both when information which has a lower degree of reuse replaces information which would have a higher degree of reuse if it were still present in the cache and when data is intentionally redundantly stored in the cache for error detection purposes. For the former, items with a higher degree of reuse should remain in the cache because it is more likely that they will be requested again (e.g. requested again multiple times). For example, some information has shorter lifetimes as compared to other information, and cache pollution by this shorter lifetime information can increase power consumption and reduce performance of the cache since it is likely that the higher lifetime information will have to be refetched from the slower, less efficient internal or external memory after having been replaced by the shorter lifetime information. However, it is still desirable to allow the information with shorter lifetimes to benefit from reuse within a cache. Implementing the redundant storage of data in a cache causes the effective working capacity of the cache to be reduced and thus results in a lower performing system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates in diagram form an exemplary allocation control register for use with the cache of FIGS. 2 and 3 in accordance with the present invention;

FIG. 5 illustrates in table form descriptions of various fields of the allocation control register of FIG. 4 in accordance with the present invention;

FIG. 6 illustrates in diagram form an exemplary embodiment of a locking control register of the cache control circuitry of FIG. 2;

FIG. 7 illustrates in table form a decoding of the locking control register of FIG. 6;

FIG. 8 illustrates in diagram form an exemplary embodiment of a mirroring control register of the cache control circuitry of FIG. 2;

FIG. 9 illustrates in table form a decoding of the mirroring control register of FIG. 8;

FIG. 10 illustrates in diagram form an exemplary embodiment of a lock mirroring control register of the cache control circuitry of FIG. 2;

FIG. 11 illustrates in table form a decoding of the lock mirroring control register of the cache control circuitry of FIG. 2;

DETAILED DESCRIPTION

In one embodiment a data processing system is herein provided having cache circuitry, mirroring control logic and comparison logic. The cache circuitry has a plurality of ways and is coupled to the mirroring control logic. The mirroring control logic indicates both a mirrored way pair of the plurality of ways and a non-mirrored way of the plurality of ways. The mirrored way pair has a first way and a second way wherein the second way is configured to store cache data fields redundant to cache data fields of the first way. A comparator responds to an access address hitting in the first way or the second way of the mirrored way pair. The comparator implements a bit comparison between cache data from the first way addressed by an index portion of the access address with cache data from the second way addressed by the same index portion of the access address to provide a bit parity error signal. Mirroring of data allows for a straightforward method of multi-bit error detection and possible correction without requiring a read-modify-write operation when updating a portion of cache storage protected by a set of protection bits, unlike traditional EDC (Error Detection Code) or ECC (Error Correction Code) multi-bit error detection/correction codes. When using EDC/ECC correction coding, a predetermined amount of data is covered by a single coded protection field. In many instances, the width of the predetermined amount of data is made large so as to amortize the overhead of the protection field. For example, a protection field width of 8 bits is required for a SECDED (Single Error Correction, Double Error Detection) ECC code on a 64-bit data value. When modifying a portion of the 64-bit data value, such as when writing 1, 2 or 4 bytes, the new protection code must be recalculated by reading (and optionally correcting) the existing data which is not to be modified, modifying the portion of the data (1, 2 or 4 bytes of the 8 byte data quantity), and then writing the updated data and protection fields back to storage. This read-modify-write operation incurs a cost in complexity and throughput which is undesirable in many circumstances.

Mirroring of data allows for multi-bit error detection and possible correction without requiring read-modify-write operations, and thus may be preferred for storage of modifiable data. Due to the additional storage overhead however, it may not be desirable as an error detection technique for all types of information, particularly for read-only or instruction information, which does not require modification in partial-width quantities, and thus may benefit from using traditional EDC/ECC protection. In one form, selective mirroring of cache ways is herein provided, allowing selected predetermined data to be protected by traditional EDC/ECC coding, and other predetermined information to be protected by mirroring of the data.

Figure 1:
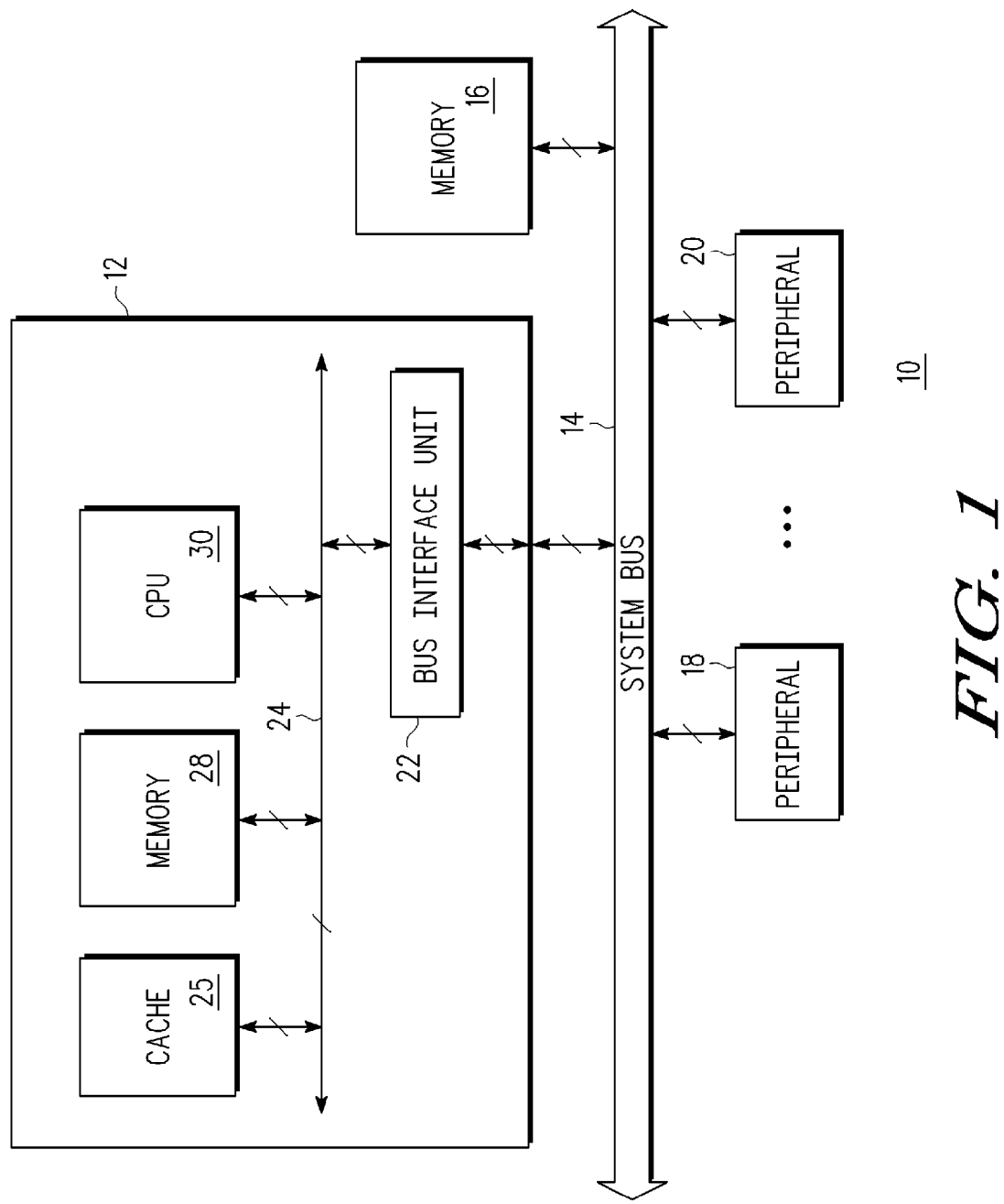
FIG. 1 illustrates in block diagram form an exemplary data processing system for using one form of the present invention.

Illustrated in block diagram form in FIG. 1 is a data processing system 10 in accordance with one embodiment of the present invention. As will be described in detail below, the data processing system 10 uses cache circuitry having a plurality of ways with each way having a plurality of sets. Each set includes a data field. Mirroring control logic (not shown in FIG. 1) is coupled to the cache circuitry for indicating at least one mirrored way pair of ways within the plurality of ways. As used herein the term mirrored way pair is defined as a pair of ways having duplicative, the same or redundant data. The mirroring control logic also indicates any non-mirrored way or ways of the plurality of ways. For a mirrored way pair, redundant information is stored in a second way that is paired with a first way. A cache way contains a plurality of individual lines or entries that are selected by a set index. The grouping of lines from all ways which have the same index is referred to as a set. Multiple ways exist in the cache. As disclosed herein the data processing system 10 can selectively mirror ways of a cache that are protected by parity error detection in order to maximize the effective working capacity of the cache.

Data processing system 10 includes a processor 12, a system bus 14, a memory 16 and a plurality of peripherals such as a peripheral 18, a peripheral 20 and, in some embodiments, additional peripherals as indicated by the dots in FIG. 1 separating peripheral 18 from peripheral 20. The memory 16 is a system memory that is coupled to the system bus 14 by a bidirectional conductor that, in one form, has multiple conductors. In the illustrated form each of peripherals 18 and 20 is coupled to the system bus 14 by bidirectional multiple conductors as is the processor 12. The processor 12 includes a bus interface unit 22 that is coupled to the system bus 14 via a bidirectional bus having multiple conductors. The bus interface unit 22 is coupled to an internal bus 24 via bidirectional conductors. The internal bus 24 is a multiple-conductor communication bus. Coupled to the internal bus 24 via respective bidirectional conductors is a cache 25, a memory 28, and a central processing unit (CPU) 30. CPU 30 implements data processing operations. Each of cache 25, memory 28, and CPU 30 are coupled to the internal bus via respective bidirectional conductors. Note that memory 28 and memory 16 can be any type of memory, and peripherals 18 and 20 can each be any type of peripheral or device. In one embodiment, all of data processing system 10 is on a single integrated circuit. Alternatively, data processing system 10 can be implemented using more than one integrated circuit. In one embodiment, at least all of processor 12 is on a single integrated circuit. In some embodiments, memory 28 may not be present.

In operation, the processor 12 functions to implement a variety of data processing functions by executing a plurality of data processing instructions. Cache 25 is a temporary data store for frequently-used information that is needed by CPU 30. In one embodiment, cache 25 is a set-associative unified cache which is capable of storing multiple types of information, such as instruction information and data information (e.g. operand information). In an alternate embodiment, cache 25 may be implemented as multiple caches, such as a separate instruction cache and a data cache. Information needed by CPU 30 that is not within cache 25 is stored in memory 28 or memory 16. In one embodiment, memory 28 may be referred to as an internal memory where it is internal to processor 12 while memory 16 may be referred to as an external memory where it is external to processor 12. Bus interface unit 22 is only one of several interface units between processor 12 and system bus 14. Bus interface unit 22 functions to coordinate the flow of information related to instruction execution by CPU 30. Control information and data resulting from the execution of instructions are exchanged between CPU 30 and system bus 14 via bus interface unit 22.

Figure 2:
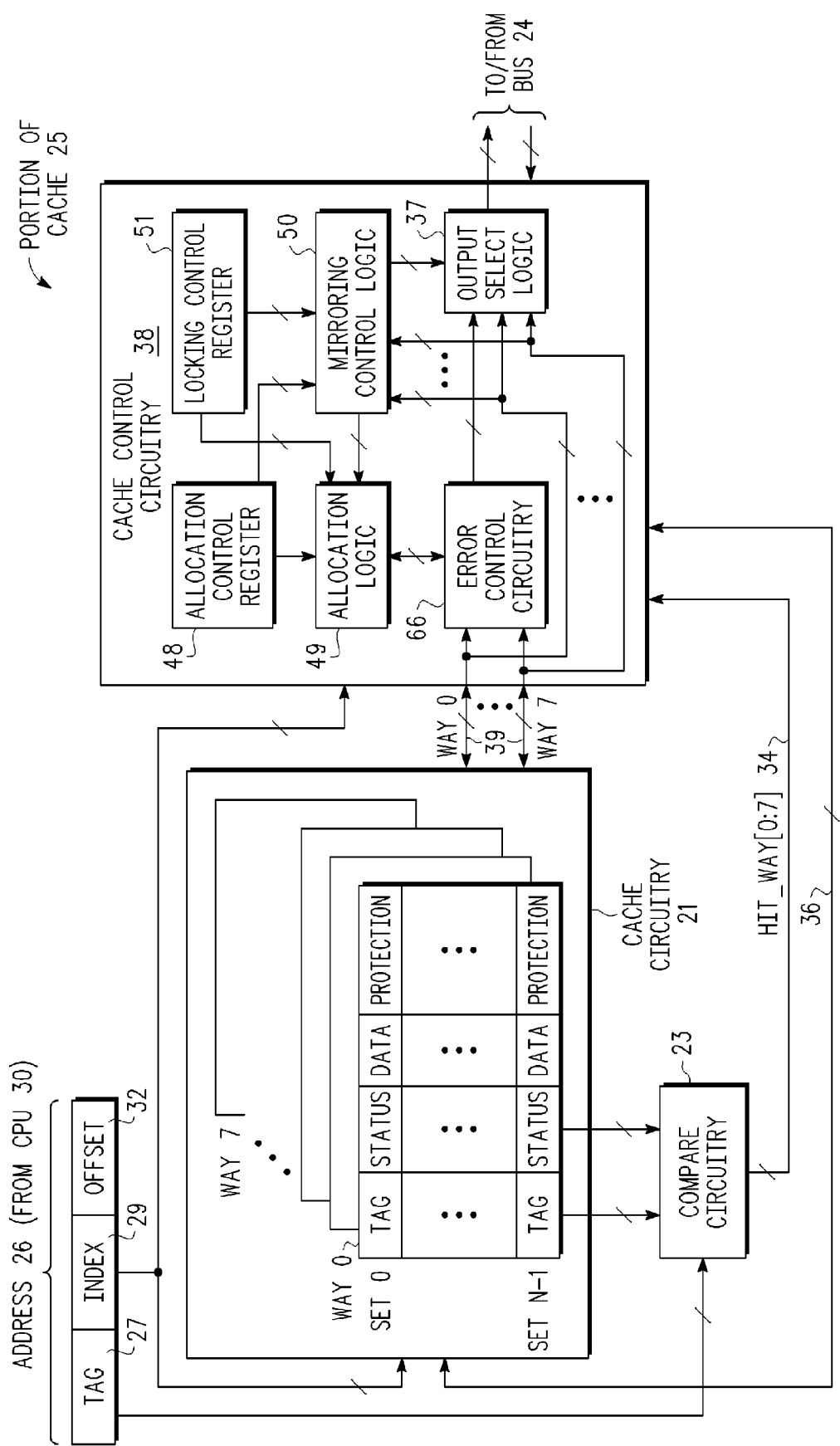
FIG. 2 illustrates in block diagram form an exemplary portion of the cache of the system of FIG. 1 in accordance with the present invention.

FIG. 2 illustrates a portion of cache 25 of FIG. 1 in accordance with one embodiment. Alternate embodiments of cache 25 may use a different structure than that illustrated in FIG. 2. The portion of cache 25 illustrated in FIG. 2 has "N" sets and 8 ways, and may be referred to as a multi-way unified cache or as a multi-way set-associative unified cache. Therefore, cache 25 can be described as having N sets, each set having lines from eight ways. Cache 25, in alternate embodiments, may have any number of sets and any number of ways. Note that, as used herein, a cache line refers to an intersection of a cache way and a set. For example, way 0 includes N cache lines, each corresponding to one of set 0 to set N−1. Therefore, when a way is replaced, the information in one or more cache lines (which is selected by index portion 29, as will be described below) is actually replaced. That is, the entire way may not be replaced, but only one or more particular lines or entries.

In the illustrated embodiment, cache circuitry 21 is storage circuitry which stores information in each of a plurality of cache lines or entries. For example, cache circuitry 21 includes tag, status, cache data, and protection fields for the cache lines or entries. Address 26 is provided from CPU 30. Address 26 includes a tag portion 27, an index portion 29, and an offset portion 32. Index portion 29 is provided to cache circuitry 21 which indicates a particular cache line or entry (i.e. one of set 0 to set N−1). Compare circuitry 23 is coupled to receive tag portion 27 and is coupled to cache circuitry 21 to receive tag and status information. Based on this received information, compare circuitry 23 determines whether there has been a cache hit or a cache miss. In the illustrated embodiment, a plurality of hit/miss signals labeled HIT_WAY[0:7] 34 are provided to cache control circuitry 38. Each HIT_WAY[0:7] 34 signal indicates whether or not there has been a cache hit for its corresponding way in cache circuitry 21. Alternate embodiments may use a cache miss signal in addition to or instead of a cache hit signal.

Cache control circuitry 38 is coupled to cache circuitry 21 by way of conductors or signals 36 and 39. Address 26, including index portion 29, is provided to the cache control circuitry 38 for indicating a particular cache line or entry (i.e. one of set 0 to set N−1) and to support ruleset operation as described below. Cache control circuitry 38 includes an allocation control register 48, allocation logic 49, output select logic 37, locking control register 51, mirroring control logic 50 and error control circuitry 66. Allocation control register 48 has a first output coupled to a first input of allocation logic 49 and has a second output coupled to a first input of the mirroring control logic 50. A first output of the locking control register 51 is coupled to a second input of the allocation logic 49, and a second output of the locking control register 51 is coupled to a second input of the mirroring control logic 50. Remaining inputs of the mirroring control logic respectively receive respective way information from the cache circuitry 21. A first output of the mirroring control logic 50 is coupled to a third input of the allocation logic 49. A second output of the mirroring control logic 50 is coupled to a first input of the output select logic 37. An input/output terminal of the allocation logic is coupled to an input/output terminal of the error control circuitry 66. Multiple inputs of the error control circuitry 66 are coupled to respective way information from the cache circuitry 21. An output of the error control circuitry 66 is coupled to a second input of the output select logic 37. An output of the output select logic 37 is coupled to the internal bus 24 and provides information to internal bus 24. Cache control circuitry 38 is also coupled to receive information from internal bus 24.

In the illustrated embodiment, cache circuitry 21 is a unified cache which is capable of storing multiple types of information. That is, the cache data field of each cache line may store instruction information or data information (e.g. operand information). Furthermore, each way of cache circuitry 21 can be allocated to store a particular information type. For example, each way can be configured independently to store instruction information, data information (e.g. operand information), or both instruction and data information. In one embodiment, one or more of the ways of cache circuitry 21 can be configured to store read-only data information or modifiable data information. In an alternate form, cache circuitry 21 may correspond to a data cache for storing only data information (e.g. operand information), and one or more of the ways of cache circuitry 21 can be configured to store read-only data information or modifiable data information.

FIG. 4 illustrates, in diagrammatic form, one embodiment of allocation control register 48 which includes a 2-bit way allocation control field for each of ways 0-7. FIG. 5 illustrates, in table form, descriptions for the way allocation control fields of FIG. 4. For example, way 0 allocation control field is a 2-bit field which indicates what type of information can be stored in the cache data field within way 0. For example, when way 0 allocation control field has a value of 01, way 0 is available for replacement by instruction miss line fills. That is, with a value of 01, way 0 stores instruction type information. When way 0 allocation control field has a value of 10, way 0 is available for replacement by data miss line fills. That is, with a value of 10, way 0 stores data type information. When way 0 allocation control field has a value of 11, way 0 is available for replacement by data or instruction miss line fills. That is, with a value of 11, way 0 stores both instruction type and data type information. Therefore, for each way, the corresponding way allocation control field indicates whether the corresponding way stores a first type of information (e.g. instruction type information when the corresponding way allocation control field has a value of 01), stores a second type of information (e.g. data type information when the corresponding way allocation control field has a value of 10), or both the first and second types of information (e.g. both instruction type and data types of information when the corresponding way allocation control field has a value of 11). In the illustrated embodiment, the value of 00 for each way allocation control field is reserved for possible future use. Alternate embodiments may include more or less fields, and each field may include more or less bits, as needed, to indicate the type of information to be allocated for a particular way of cache 25. The types of information are given by way of example only and can also include a combination of data type and instruction type as well as read-only data type information.

Although one type of architecture for cache 25 has been illustrated in FIG. 2, alternate embodiments of cache 25 may use any desired or appropriate architecture. The architecture illustrated in FIG. 2 is merely intended to be one of various possible representative architectures. Any cache architecture that allows for the desired cache replacement may be used.

Referring back to FIG. 2, in operation, index portion 29 is used to select a set in cache circuitry 21. The tag information from cache circuitry 21 is compared to tag portion 27 and qualified by status information (e.g. valid bits) from cache circuitry 21. The result of the compare and qualification (e.g. match and valid) determines whether or not a cache hit occurs. As described above, each HIT_WAY[0:7] 34 signal indicates whether or not there has been a cache hit for its corresponding way in cache circuitry 21.

In the case of a read access to cache 25, upon a cache hit, the cache data and protection fields of the cache line which resulted in the cache hit are provided, via conductors 39, to cache control circuitry 38. The cache data can then be provided to bus 24 via output select logic 37 which, using HIT_WAY[0:7] 34, selects the output for the way which resulted in the cache hit. Also, note that an error indicator can also be provided to bus 24 via output select logic 37 to indicate whether or not an error has occurred. Note that if error correction is also being performed, then the corrected cache data from error control circuitry 66 will be output via output select logic 37 rather than the data provided from cache circuitry 21. Furthermore, if corrected cache data is being provided, the error indicator may be negated to indicate that there is no error with the cache data being provided (since it has been corrected).

In the case of a write access to cache 25, upon a cache hit, information (e.g. the cache data for storage into cache circuitry 21) can be received from bus 24 by cache control circuitry 38. The cache data can be provided by cache control circuitry 38 for storage into the appropriate cache line of cache circuitry 21 via conductors 39. Also, cache control circuitry 38 can appropriately update the status field of the cache line. (Note that the specific circuitry used to receive the cache data and route it to the line within cache circuitry 21 which caused the hit and to update the status information is not illustrated, since it is well understood in the art.) The received cache data is also provided to error control circuitry 66 so that the corresponding error control circuitry within error control circuitry 66 (as selected by HIT_WAY[0:7] 34) can generate the appropriate protection information. This corresponding protection information may also be provided, along with the received cache data, by cache control circuitry 38 for storage into the appropriate cache line of cache circuitry 21 which resulted in the cache line hit. Note that if error correction is also being performed, then the corrected received cache data (if an error was detected) will be provided for storage into cache circuitry 21.

In the case of a cache miss, replacement logic circuitry (not shown), using information from allocation control register 48, identifies a cache line for replacement and updates the cache line. Any known method of cache allocation can be used to select a cache line for replacement, such as, for example, a round robin method, a pseudo-least recently used (PLRU) method, etc. Replacement logic circuitry (not shown) combines the replacement method with the information from allocation control register 48 to select a way for replacement which is enabled to be allocated for a particular type of information. Upon a cache miss, the new cache data for storage into the newly allocated cache line is provided to cache control circuitry 38 by internal bus 24. The new cache data can then be provided for storage into the newly allocated cache line of cache circuitry 21 via conductors 39. Also, cache control circuitry 38 can appropriately generate the status information for storage into the status field of the newly allocated cache line. (Note that the specific circuitry used to receive the cache data and route it to the newly allocated cache line within circuitry 21 and to generate the status information for the newly allocated cache line is not illustrated, since it is well understood in the art.) The new cache data is also provided to error control circuitry 66 so that the corresponding error control circuitry that is within error control circuitry 66 (corresponding to the way selected by the replacement logic circuitry which includes the newly allocated cache line) can generate the appropriate protection information. This corresponding protection information may also be provided, along with the received cache data, by cache control circuitry 38 for storage into the newly allocated cache line of cache circuitry 21. Note that if error correction is also being performed, then the corrected new cache data (if an error was detected) will be provided for storage into cache circuitry 21.

In the illustrated embodiment, cache control circuitry 38 also provides control signals 36 to cache circuitry 21 (e.g. for read/write control). For example, cache control circuitry 38 may, under control of CPU 30, update cache circuitry 21. For example, CPU 30 may execute special cache instructions to update status information. Also, in one embodiment, cache control circuitry 38, under control of CPU 30, such as via special cache instructions, may update allocation control register 48 to change how the ways of cache circuitry 21 are allocated. Although FIG. 2 illustrates specific circuitry that may be used to implement a portion of cache 25 of FIG. 1, alternate embodiments may use any desired circuitry. A wide variety of circuit implementations may be used. The circuitry illustrated in FIG. 2 is merely intended to illustrate one possible embodiment.

Figure 3:
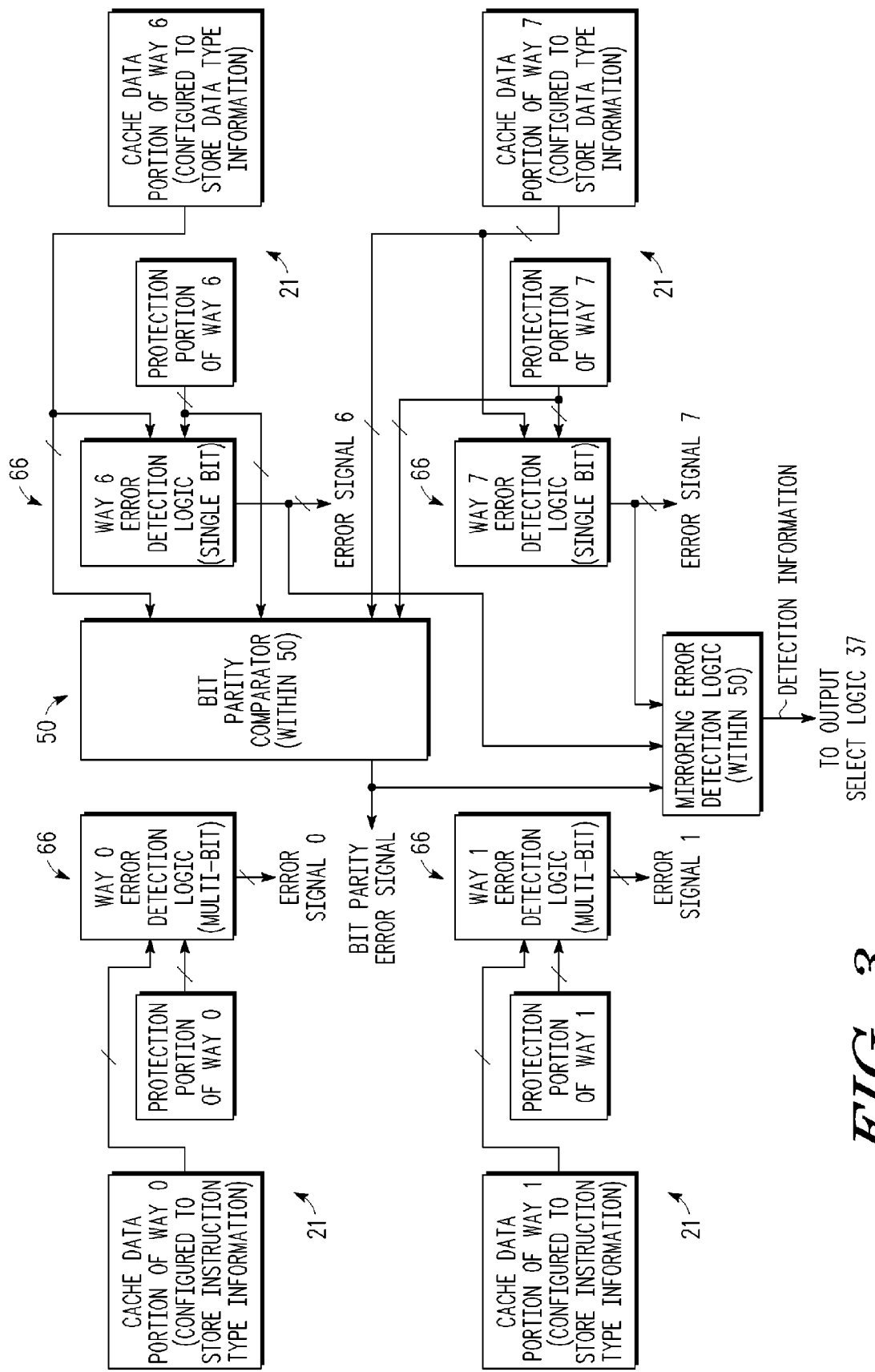
FIG. 3 illustrates in block diagram form an exemplary embodiment of a portion of the cache and cache control circuitry of the system of FIG. 1 in accordance with the present invention.

Illustrated in FIG. 3 is an example of the reading of data from cache 25 that demonstrates the functional relationship between the cache circuitry 21, the error control circuitry 66 and the mirroring control logic 50 of FIG. 2. Within the cache circuitry 21 is a plurality of cache data portions and protection portions for each of the ways. Each cache data portion and protection portion respectively stores data and protection information for a plurality of lines or sets. For convenience of illustration only ways 0, 1, 6 and 7 are illustrated in FIG. 3.

The mirroring control logic 50 which is coupled to the cache circuitry 21 indicates one or more mirrored way pairs of the various ways in the cache circuitry 21 and also indicates one or more non-mirrored ways of the plurality of ways in cache circuitry 21. By way of example in FIG. 3, the mirroring control logic 50 has indicated ways 6 and 7 to be a mirrored way pair and has indicated ways 0 and 1 to be non-mirrored ways.

Each way has a cache data portion that is configured by the allocation control register 48 to store instruction type information, data type information, or both. Therefore the mirroring control logic determines the mirrored way pair of the plurality of ways based at least in part on the allocation information provided by the allocation control register 48. In the FIG. 3 example the cache data portion of ways 0 and 1 are configured to store instruction type information and the cache data portion of ways 6 and 7 are configured to store data type information. In the illustrated form the protection portion of a way that is configured to store instruction type information contains multiple check bits for implementing multiple-bit error checking. The protection portion of a way that is configured to store data type information contains parity bits for implementing single-bit error detection. Thus ways 0 and 1 are implementing multiple-bit error checking and ways 6 and 7 are implementing single-bit parity error detection. The designation of what type of error detection is implemented is also configurable through allocation control register 48. The per-way error detection logic circuitry illustrated in FIG. 3 (indicated as a portion of error control circuitry 66 of FIG. 2) receives both protection bits and cache data bits and indicates if there are errors in the data by asserting an error signal.

Since the ways 6 and 7 are mirrored, these two ways are configured to store cache data ways that are the same or are redundant. The respective protection portions and data portions of ways 6 and 7 are coupled to a bit parity comparator that is part of the mirroring control logic 50. The bit parity comparator of mirroring control logic 50 implements a parity check between the stored data portion and protection portion of the mirrored ways to determine whether one or more stored bits of information have different values between the two mirrored ways. In other words, the bit parity comparator functions as comparison logic which in response to address 26 hitting in way 6 or way 7 of the mirrored way pair performs a bit comparison between cache data from way 6 addressed by an index portion of address 26 and cache from way 7 addressed by the same index portion of address 26. In response to detecting one or more different single data bits, the Bit Parity error signal is asserted by the bit parity comparator.

Upon detecting a single bit error, the bit parity comparator asserts a Bit Parity Error Signal. The Bit Parity Error Signal and the error signals from the error detection logic of ways 6 and 7 are coupled to inputs of a mirroring error detection logic that is also part of the mirroring control logic 50. The mirroring error detection logic and the individual way N error detection logic function to indicate whether there is an error from any of the error signals and provide that determination to the output select logic 37 for use in determining whether data from any of the coupled ways 0 to 7 should be output.

In the example illustrated in FIG. 3, assume address 26 hits in way 0, a non-mirrored way. The index portion of address 26 addresses the cache data portion of way 0 and the associated protection portion of way 0 and these portions are used by the way 0 error detection logic to provide error signal 0 which indicates whether or not a multiple bit error is present within the cache data from this non-mirrored way. In response to address 26 hitting in way 6, a mirrored way, the way 6 error detection logic uses the cache data information from way 6 that is addressed by the index portion of address 26 to provide Error Signal 6 which indicates whether a single bit error is present within the cache data from way 6. Additionally, the bit parity comparator compares the stored information from way 6 and way 7 and determines if there are any mismatches in the stored (mirrored) data from these ways, and if one or more differences are detected, asserts the bit parity error signal. The bit parity comparator thus performs a "per-bit" error detection function in addition to the individual per-way single bit error detection provided by the way 6 error detection logic and way 7 error detection logic portions of error control circuitry 66.

The mirroring detecting logic in FIG. 3 that is within mirroring control logic 50 receives the error signals from the way 6 error detection logic and the way 7 error detection logic of error control circuitry 66 for the mirrored pair of ways 6 and 7 and receives the bit parity error signal provided by the bit parity comparator. The error detection logic in FIG. 3 functions as error correction logic to correct an error within the cache data from one of the ways of the mirrored pair of ways that is based at least in part on the bit parity error signal, the Error Signal 6 and the Error Signal 7. In other words, the bit parity error signal informs the mirroring error detection logic on a bit-by-bit basis when a difference in data bit value exists between way 6 and way 7. Each of Error Signal 6 and Error Signal 7 informs the mirroring error detection logic as to which way a bit error is detected within. Based on these three pieces of information the mirroring error detection logic is able to readily correct the error and provide detection information that is provided to the output select logic 37. The detection information provided by the mirroring error detection logic functions as a select signal to enable the output select logic 37 to select and couple data from the way which did not indicate a single bit error. If multiple bit errors occur in one of way 6 or way 7, then the bit parity comparator within mirroring control logic 50 will indicate a bit parity error signal, although error signal 6 and error signal 7 may be negated, since a multi-bit error may not be detected by the single bit error detection logic for way 6 and way 7. In this case, no correction may be possible, but the presence of a multi-bit error is still detected and sent to the output select logic 37, which then informs processor 14 via internal bus 24 of the error condition.

Illustrated in FIG. 6 in diagrammatic form is one example of the locking control register 51 of the cache control circuitry 38 illustrated in FIG. 2. The locking control register 51 has a one-bit way lock control field for each of ways 0-7. FIG. 7 illustrates, in table form, descriptions for the way lock control fields of FIG. 7. The first eight bits of locking control register 51 are reserved for various other functions or additional ways. The way 0 lock control field is a single bit field which indicates whether the information stored in the cache data field within way 0 is locked from being written to. For example, when the way 0 lock control field has a value of 0, way 0 is available for replacement by cache miss line fills and is not locked. However, with a value of 1, way 0 is locked and no allocation occurs to way 0 when a cache miss occurs. Similarly, when way 7 lock control bit has a value of 0, way 7 is available for replacement by cache miss line fills and is not locked. When way 7 lock control bit has a value of 1, way 7 is locked and is not available for replacement in response to a cache miss. Therefore, for each way, the corresponding way lock control field indicates whether the corresponding way is not locked (allocation can occur) or is locked (no allocation occurs). Alternate embodiments may include more or less fields, and each field may include more or less bits, as needed, to indicate selective locking depending upon processing conditions. For example, additional field encodings of the fields in register 51 may implement selective way unlocking when a low power condition or a high die temperature is detected to conserve system power or prevent additional system bus activity.

Illustrated in FIG. 8 in diagrammatic form is one example of a way mirroring control register that, in one form, is within the mirroring control logic 50 of the cache control circuitry 38 illustrated in FIG. 2. The way mirroring control register has a one-bit way mirroring control field for selective pairs of the ways 0-7. In the illustrated form ways 0 and 1 are mirrored together. Ways 2 and 3 are mirrored together. Ways 4 and 5 are mirrored together. Ways 6 and 7 are mirrored together. FIG. 9 illustrates, in table form, descriptions for the way mirroring control fields of FIG. 8. The first twelve bits of the way mirroring control register are reserved for various other functions or additional ways. The way 0/way 1 mirroring control field is a single bit field which indicates whether ways 0 and 1 are mirrored together for implementing the single bit and per-bit error detection as described in connection with FIG. 3 for ways 6 and 7. For example, when the way 0/way 1 mirroring control field has a value of 0, ways 0 and 1 are not mirrored together. However, with a value of 1, way 0 is mirrored with way 1. Similarly, when way 6/way 7 mirroring control bit has a value of 0, way 6 and way 7 are not mirrored together. When way 6/way 7 mirroring control bit has a value of 1, ways 6 and 7 are mirrored together. Therefore, for each predetermined way pair, the corresponding way mirroring control field indicates whether that way pair is mirrored or not. Alternate embodiments may include more or less fields, and each field may include more or less bits, as needed, to indicate selective mirroring depending upon processing conditions.

Illustrated in FIG. 10 in diagrammatic form is one example of a way lock mirroring control register that, in one form, is within the mirroring control logic 50 of the cache control circuitry 38 illustrated in FIG. 2. The way lock mirroring control register has a one-bit way mirroring control field for selective pairs of ways 0-7. In the illustrated form of the FIG. 10 register the ways 0 and 1 are available for line lock mirroring. Ways 2 and 3 are available for line lock mirroring. Ways 4 and 5 are available for lock mirroring. Ways 6 and 7 are available for lock mirroring. FIG. 11 illustrates, in table form, descriptions for the way lock mirroring control fields of FIG. 10. The first twelve bits of the way lock mirroring control register are reserved for various other functions or additional ways. The way 0/way 1 lock mirroring control field is a single bit field which indicates whether ways 0 and 1 are available for line lock mirroring. When two ways are available to be line lock mirrored, selective lines within the ways are locked and the ways are mirrored for those locked lines, thus implementing the per-bit error detection as described in connection with FIG. 3 for locked lines within ways 6 and 7. Way mirroring is not performed for unlocked lines within ways 6 and 7, thus, the unlocked lines do not use bit parity comparator within the mirroring control logic 50, but do use way error detection logic portions of the error control logic 66 to detect single bit errors in the unlocked lines within individual ways. When lines within the ways are locked, no allocation or writing to them occurs when a cache miss occurs. For example, when the way 0/way 1 mirroring control field has a value of 0, ways 0 and 1 are not available for line lock mirroring. However, with a value of 1, way 0 is available for line lock mirroring with way 1. Similarly, when the way 6/way 7 lock mirroring control bit has a value of 0, way 6 and way 7 are not available for line lock mirroring. When way 6/way 7 mirroring control bit has a value of 1, ways 6 and 7 are mirrored together for selective lines within the mirrored ways 6 and 7 that are locked. The way lock mirroring control register controls what mirrored ways are available for line lock mirroring whereas the processing circuitry, such as CPU 30, provides line locking commands which actually set one or more lock bits in the status field of each line of the cache 25. Therefore, for each predetermined way pair, the corresponding way lock mirroring control field indicates whether that way pair is available for line lock mirroring. Alternate embodiments may include more or less fields, and each field may include more or less bits, as needed, to indicate selective lock mirroring depending upon processing conditions. A line locking command that is issued by the processing circuitry has an associated address. In one form an index portion of the address is used to address both a first line of a first way and a second line of a second way wherein the same line location in both ways are addressed. When a line locking command has been issued by the processing circuitry, the allocation logic 49 uses the predetermined way mirroring pairing to select a first way of the cache for allocating a first line having its corresponding line locking indicator set to indicate the first line is locked. The allocation logic 49 also uses the predetermined way mirroring pairing to select a second way, paired with the first way, for allocating a second line which stores tag, status and cache data information that is redundant to tag, status and cache data information of the first line. If the allocation logic 49 is unable to allocate both the first line in the first way and the second line in the second way, the allocation logic 49 provides an unable to lock indicator to the error control circuitry in response to the line locking command provided by the processing circuitry.

In one form in response to a cache miss the allocation logic 49 uses both the predetermined pairings of mirrored ways and the way locking control information to select a next available way for allocation which may be either a next available non-mirrored and unlocked way or a next available mirrored and unlocked way. In another form when the next available way is in a predetermined way pairing that has mirroring enabled, the allocation logic 49 also selects a second way for allocation that is paired with the next available way as indicated by the predetermined pairings. In some applications where critical data or often-used data is stored in cache 25, each way within the predetermined pairings for which way mirroring is enable is a locked way.

Figure 12:
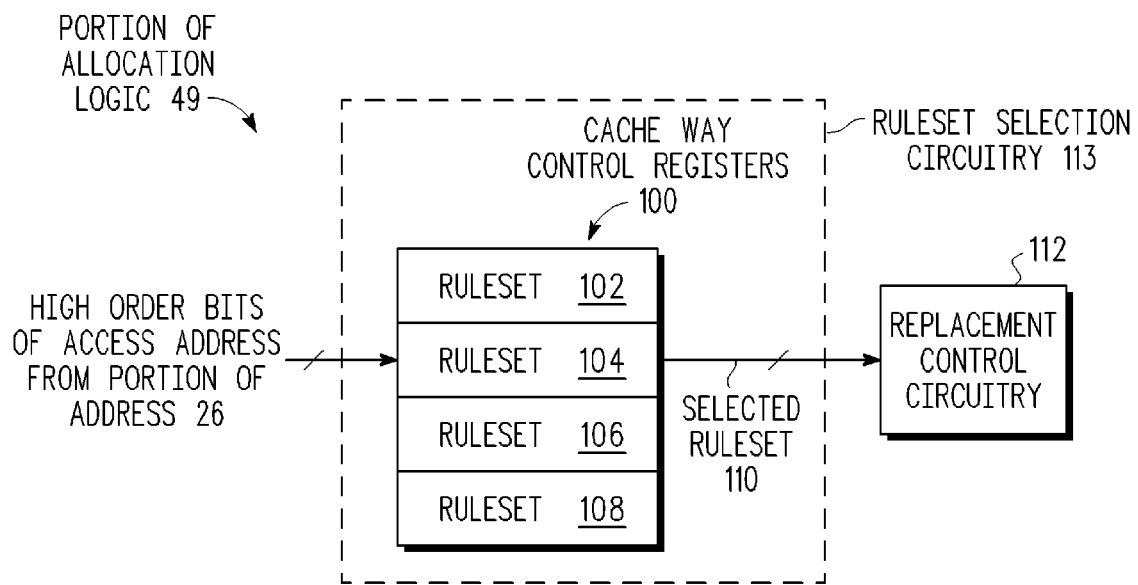
FIG. 12 illustrates in block diagram form a portion of the cache control circuitry of FIG. 2 in accordance with one embodiment of the present invention.

Illustrated in FIG. 12 is one embodiment of a portion of cache control circuitry 38 of FIG. 2. The allocation logic 49 of FIG. 2 includes ruleset selection circuitry 113, which includes cache way control registers 100, and replacement control circuitry 112. Ruleset selection circuitry 113 receives the high order bits of access address 26 from the address portion of internal bus 24 and uses these high order bits to select one of rulesets 102, 104, 106, and 108 as a selected ruleset 110. Thus each ruleset of a plurality of rulesets corresponds to a predetermined address range. Selected ruleset 110 is then provided to replacement control circuitry 112 which outputs a write enable signal (not shown). In the illustrated embodiment, the two highest order bits of access address 26 are used to select one of four possible rulesets (102, 104, 106, 108). However, note that in alternate embodiments, any number of higher order bits can be used to allow for a selection among a smaller or larger number of possible rulesets. For example, the three highest order bits of access address 26 may be used to select between eight (or less) possible rulesets. In one embodiment, the high order bits of access address 26 used to select a ruleset are otherwise unused address bits within cache 25 and data processing system 10. Therefore, since they are otherwise unused, they can be set to select whichever ruleset is desired for particular access addresses (as defined by the remaining bits of access address 40). For example, those addresses which correspond to predominately transient data may be assigned to a particular way of cache 25 such that only certain ways of cache 25 may store transient data. In this example, the high order bits of the addresses for transient data may be set to a value, such as binary 10, so as to select ruleset 106 which identifies which ways are available for that particular type of transient data. Similarly, the higher order bits of those addresses which correspond to instructions or other longer lifetime information may be set to a value, such as binary 00, so as to select ruleset 102 which may be used to identify which ways are available for that particular type of longer lifetime data.

Note that in alternate embodiments, there may be other bits (such as other otherwise unused bits, or bits which are used) within the access address that may be used other than the highest order bits to select an appropriate ruleset. That is, in alternate embodiments, ruleset selection circuitry 113 may receive other portions of access address 26 to select a ruleset. Also, note that with the embodiment of FIG. 2, an existing data processing system design having unused address bits or lines may be easily retrofitted to implement the portions of cache control circuitry 38 described above with minimal additional circuitry.

Although not shown in FIG. 12, note that a decoder may be used to decode the high order bits of access address 26 to provide a selection signal to cache way control registers 100 to select the appropriate ruleset. Therefore, it should be apparent that ruleset selection circuitry 113 may be implemented in a variety of different ways which allow a number of address bits to be used to select one of N entries.

Figure 13:
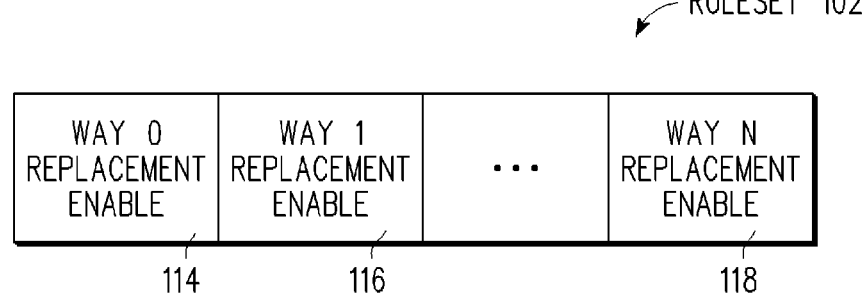
FIG. 13 illustrates, in diagram form, a ruleset portion of the cache way control registers of FIG. 12 in accordance with one embodiment of the present invention.

FIG. 13 illustrates one example of ruleset 102, in accordance with one embodiment of the present invention. In the illustrated embodiment, ruleset 102 includes one replacement enable field for each way (0 through N, where N is a predetermined integer) of cache 25. For example, ruleset 102 includes a way 0 replacement enable 114, a way 1 replacement enable 116, and a way N replacement enable 118. In one embodiment, each ruleset, such as ruleset 102, is stored within a user programmable register such that each bit within the ruleset is user programmable. Each replacement enable field of ruleset 102 indicates whether the corresponding way is available for replacement. That is, each replacement enable field indicates whether the corresponding way is available for storing the information that was fetched from memory in response to an access request which resulted in a miss. For example, ruleset 102 may be used to correspond to those addresses storing longer lifetime information, as described in the example of the previous paragraph. In this example, a user may wish to set aside ways 0 and 5 for use for this type of longer lifetime information, and can therefore assert the replacement enable fields for ways 0 and 5 in ruleset 102. In another example, ruleset 102 may be used to correspond to those addresses storing the shortest lifetime information within the system, meaning the user may want to allocate only one of ways 0 through N to use for this type of information. In this manner, a ruleset (such as ruleset 102) may be used to reduce cache pollution by only allocating a particular number of ways to the type of information most likely to increase cache pollution. Note that in one embodiment, each replacement enable field of ruleset 102 is a single bit to indicate whether the way is enabled or not. In an alternate embodiment, an asserted bit may indicate that a particular way is not available for replacement. Alternatively, more or fewer bits may be used, and the fields for particular ways may be combined or encoded differently.

Referring back to FIG. 12, cache way control registers 100, in one embodiment, includes a plurality of registers, one to store each of rulesets 102, 104, 106 and 108 where each ruleset may be implemented as ruleset 102 (as described above in reference to FIG. 13). Alternatively, cache way control registers 100 may include more or less registers, as needed, depending on, for example, the number and size of desired rulesets for a desired implementation. Also, in an alternate embodiment, they may not be implemented as registers but may be located in another internal or external memory. In one embodiment, the registers are user programmable so as to allow flexibility to a user so that the user may decide how to use the available rulesets and how to allocate different ways of cache 25 for different types of information. Once a particular ruleset is selected by the high order bits of access address 26, it is provided as selected ruleset 110 to replacement control circuitry 112.

Replacement control circuitry 112 determines, based on the selected ruleset 110, which way is to be selected for storing the fetched information in response to the cache miss. For example, selected ruleset 110 (corresponding to one of rulesets 102, 104, 106, 108) may indicate that more than one way is available for replacement, and therefore replacement control circuitry 112 can determine which ways are available based on selected ruleset 110, and then determine which of the available ways is to be used for the current replacement. In one embodiment, replacement control circuitry 112 may use a round robin approach to select the way, or alternatively, a least recently used approach may be used. Many other methods, as known in the art, may be used to select a way of the available ways for the replacement. Furthermore, once the way for replacement is selected, replacement control circuitry 112 can use a variety of ways, as known in the art (such as a round robin method or a least recently used method), to modify replacement state information. Once the way is selected, replacement control circuitry 112 may provide a write enable signal to enable the selected way of cache 25. In one embodiment, the write enable signal provides one write enable signal to each way of cache 25. For example, if cache 25 includes eight ways (e.g. ways 0 through 7), then the write enable signal would include eight enable signals, one for each way. Alternatively, replacement control circuitry 112 (or other control circuitry) may encode the write enable signals to provide the write enable signal. For example, if cache 25 includes eight ways, then a 3-bit write enable signal may be used to select one of the eight ways. Cache control circuitry 38 is also able to access the tag fields of the ways as necessary to perform the replacement. Note also that in an alternate embodiment, the selected ruleset may not enable any ways for replacement or replacement control circuitry 112 may not select any way at all from the available ways.

Figure 14:
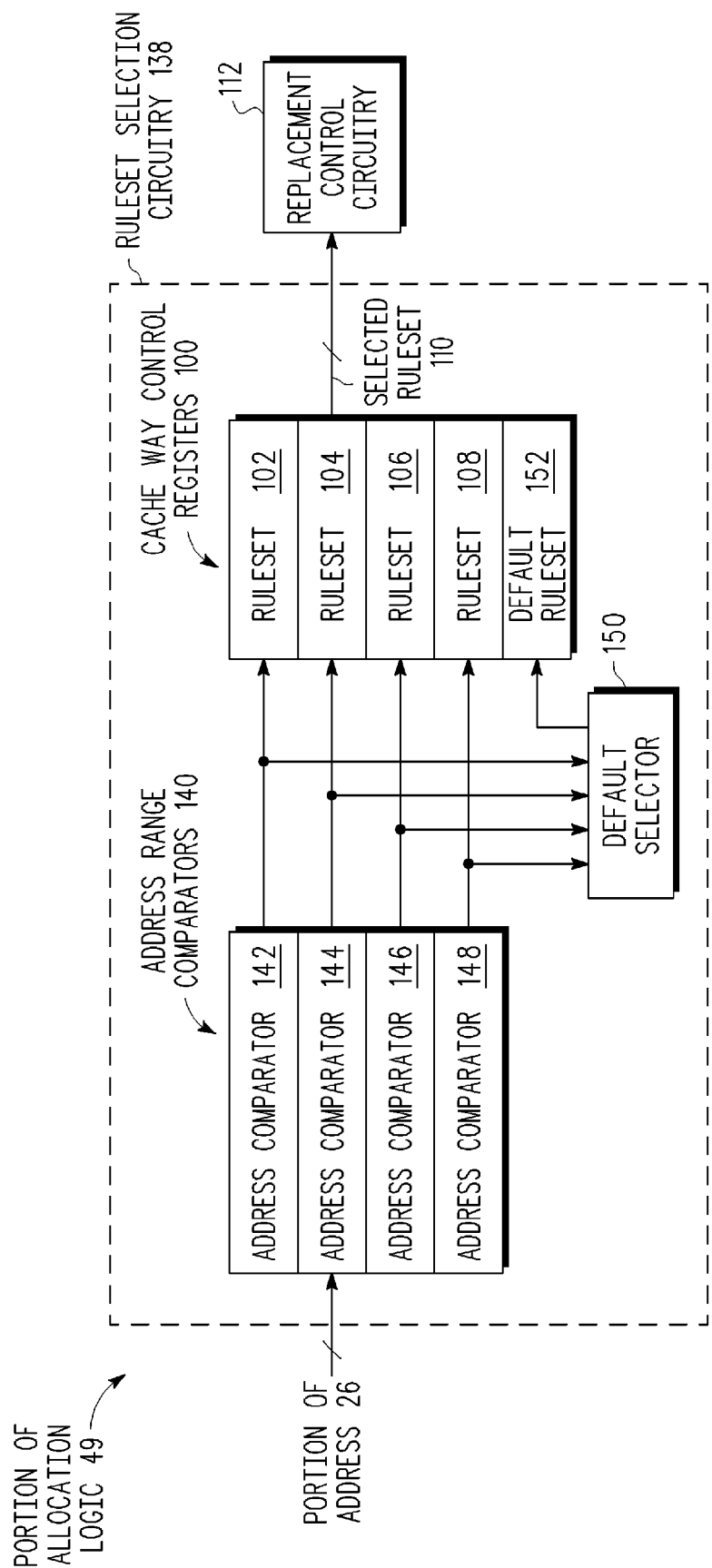
FIG. 14 illustrates in block diagram form, a portion of the cache control circuitry of FIG. 2 in accordance with an alternate embodiment of the present invention.

FIG. 14 illustrates another alternate embodiment of a portion of the allocation logic 49 that is within the cache control circuitry 38. The embodiment of FIG. 14 allows a user to select a ruleset based upon all or a portion of access address 26. For example, in the illustrated embodiment, a ruleset selection circuitry 138 selects a ruleset based upon what address range, if any, access address 26 (or at least a portion of access address 26) falls within. The portion of cache control circuitry 38 of FIG. 14 includes ruleset selection circuitry 138, which includes address range comparators 140, default selector 150, and cache way control registers 100, and replacement control circuitry 112. Address range comparators 140 and default selector 150 are used to select one of rulesets 102-108 or default ruleset 152. If the access address 26 falls within one of the address ranges defined by any one of address comparators 142, 144, 146 and 148, then a respective one of rulesets 102, 104, 106 and 108 is selected. However, if access address 26 does not fall within one of the address ranges defined by any of address comparators 142, 144, 146 and 148, then default ruleset 152 is selected. Note that in one embodiment, default ruleset 152 is an additional ruleset, in addition to rulesets 102, 104, 106 and 108, but, in an alternate embodiment, default ruleset 152 may be one of rulesets 102, 104, 106 and 108. The selected ruleset is then provided as selected ruleset 110 to replacement control circuitry 112 which then provides a write enable signal. Note that cache way control registers 100 (except for default ruleset 152), selected ruleset 110, replacement control circuitry 112, and the write enable signal operate as described above.

Address range comparators 140 determine in which address range, if any, access address 26 falls into. For example, each of address comparators 142, 144, 146 and 148 may be used to define an address range. In one embodiment, each of address comparators 142, 144, 146 and 148 includes circuitry to store a starting address and an ending address of the corresponding range and comparison circuitry to compare access address 26 to the starting and ending address to determine if it falls within that range. Alternatively, each of address comparators 142, 144, 146 and 148 may include circuitry to store a base address (to define the starting address of an address range) and a mask value (to define a range from the base address) and comparison circuitry to compare access address 26 masked by the mask value to the base address masked by the mask value to determine if it falls within that range. Each range therefore indicates a corresponding ruleset. For example, in the illustrated embodiment of FIG. 14, if access address 26 falls within the address range defined by address comparator 142, then ruleset 102 is indicated. If access address 26 falls within the address range defined by address comparator 144, then ruleset 104 is indicated. If access address 26 falls within the address range defined by address comparator 146, then ruleset 106 is indicated. If access address 40 falls within the address range defined by address comparator 148, then ruleset 108 is indicated.

If access address 40 does not fall in any of the ranges defined by address range comparators 140, then default selector 150 selects default ruleset 152. For example, in one embodiment, default selector 150 may monitor to see if none of the indicators coupled between the address range comparators 140 and cache way control registers 100 are asserted and then, in response, asserts its output indicator to select default ruleset 152. Default ruleset 152 can be similar in form and function to the other rulesets, such as ruleset 102. Note also that default ruleset 152 is optional. For example, all the ranges can be defined such that access address 26 will always fall into a range. Note that alternate embodiments may include any number of address ranges, as needed. Furthermore, note that multiple address ranges may correspond to a same ruleset. In one embodiment, each of the ranges are non-overlapping. However, in alternate embodiments, they may overlap.

Therefore, address ranges may be set up by address range comparators 140 to indicate different types of information such that the rulesets may be used to enable different ways of cache 25 depending on the type of information within the address range. For example, for streaming data, the address range of addresses storing streaming data can be indicated by address comparator 146 such that if access address 40 falls within that range, streaming data is indicated, and thus, ruleset 106 is selected having those ways which are enabled (i.e. available) to store the streaming data. Therefore, a user has flexibility in defining which address ranges correspond to which ways of cache 25, and thus can use this flexibility to improve cache performance and reduce cache pollution. The mirroring control logic 50 of the cache control circuitry 38 indicates a set of mirrored way pairs and a set of non-mirrored way pairs to allocation logic 49. Mirroring is then selectively performed by cache control circuitry 38 based on available ways indicated by the selected ruleset. Alternate address ranges may be disabled for way mirroring. By programming one or more rulesets to indicate ways that are available for replacement corresponding to ways which are enabled for mirroring, one or more address ranges may be enabled for selective mirroring of ways. By also programming one or more alternate rulesets to indicate available ways which are not enabled for mirroring by mirroring control logic 50, alternate address ranges are disabled for way mirroring. It should thus be apparent that by combining the capabilities of ruleset selection circuitry 138 with mirroring control logic 50, flexible determination of way mirroring, and thus the error detection capabilities of cache locations corresponding to one or more predetermined address ranges exists.

Note that the above embodiments were described in reference to selecting a ruleset to indicate available ways within cache 25 for replacement in response to a read access which resulted in a miss. However, note that in alternate embodiments, the methods described above may be used to select a ruleset to indicate available ways within a cache for replacement for other operations, such as, for example, for prefetching, which may be done in response to hits, or misses, or both, as known in the art.

Therefore, it can be appreciated how different implementations of a ruleset selection circuitry (such as ruleset selection circuitries 113, 136, and 138) can be used to select a ruleset based upon at least a portion of an access address. In each embodiment, the rulesets can be designed in order to improve cache performance and reduce cache pollution by, for example, allocating different cache ways to different types of information. For example, in one application, a user can allocate different cache ways depending on the lifetime of the information such that shorter lifetime information does not replace (or overly replace) longer lifetime information. Alternatively, different attributes (other than or in addition to the lifetime) of information may be used for allocating different cache ways. Furthermore, the programmability of portions of the ruleset selection circuitry, such as, for example, cache way control registers 100, ruleset selector control register 126, address range comparators 140, etc., allow for a user to optimize the cache (such as cache 25) for different types of applications. Also, the embodiment of FIG. 14 allows for any number of rulesets and address ranges to be defined as needed with minimal overhead. Rulesets can also be reprogrammed at any time, as needed, including during the execution of tasks or threads. Furthermore, the optimizations can be performed without the need of allocating special software instructions and without additional software execution overhead. Also, the memory management unit does not need to have knowledge relating to the type of information stored in different memory regions.

Figure 15:
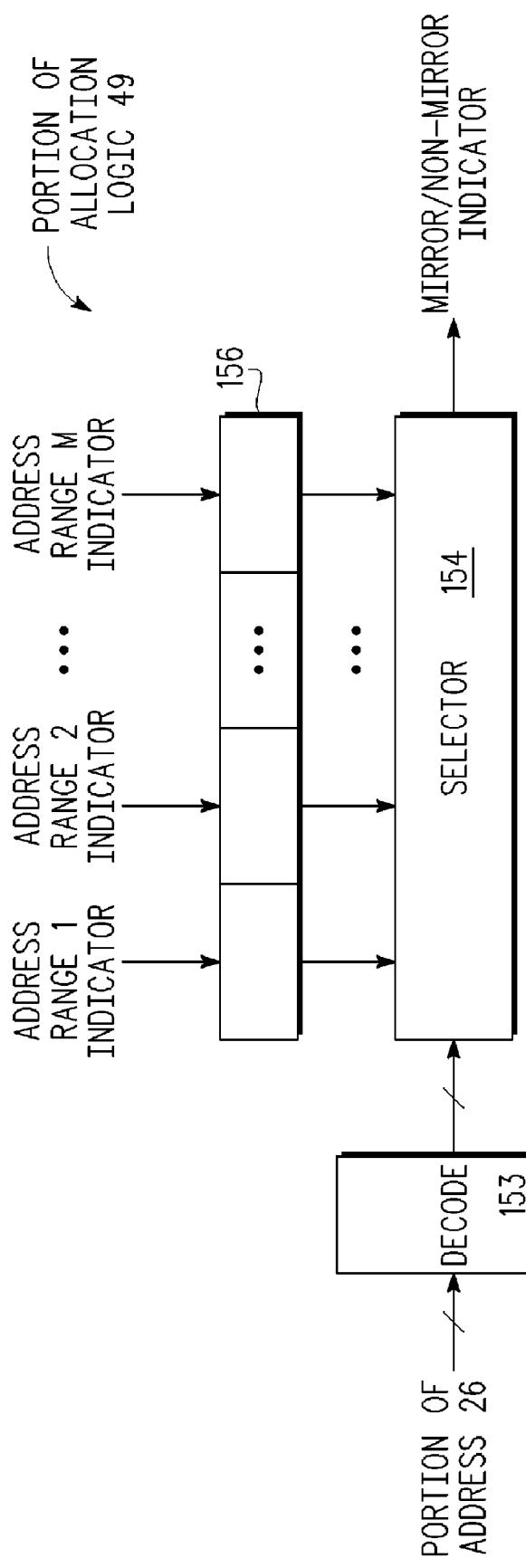
FIG. 15 illustrates in block diagram form, a portion of the cache control circuitry of FIG. 2 in accordance with yet another alternate embodiment of the present invention.

Illustrated in FIG. 15 is another portion of the allocation logic 49 of FIG. 2 that decodes a portion of the access address 26 to provide a mirror or no-mirror indicator signal for a predetermined pair of mirrored ways. Decode logic 153 has an input for receiving a portion of address 26 and a multiple bit output for providing a decoded address select signal to an input of a selector 154. The selector 154 has an output for providing a mirror/non-mirror indicator signal. Coupled to the selector 154 are outputs of a register 156. The register 156 stores a plurality of mirror/non-mirrored way indicators associated with each of M address ranges, where M is an integer. Each address range indicator is associated with a range of addresses correlated to the ways of cache 25. The selector, in response to a decoded address, selects one of the address range indicators in register 156 and outputs the appropriate address range indicator as a mirror/non-mirror indicator signal. Therefore, the allocation logic 49, in response to the access address 26 missing in the cache, uses at least a portion of the address 26 to determine whether a mirrored way from the set of mirrored way pairs or a non-mirrored way of the set of non-mirrored way pairs is to be selected for allocation. The register 156 represents storage circuitry having a plurality of fields where each field is associated with a corresponding address value and indicates whether a mirrored way or a non-mirrored way is to be selected for the corresponding address value. In one form a first portion of address 26 is used to select a field of register 156 and a second and different portion of address 26 is used to select a selected ruleset. In another form the first portion and second portion of address 26 are a same portion of address 26 and both of these functions are performed with the same address portion.

By now it should be appreciated that there has been provided a method and system for selectively implementing mirrored ways in a cache to improve the efficiency of cache memory operation including the function of error detection and correction associated with a cache. Both mirrored way pairs and non-mirrored ways are implemented in a same cache array and are controlled by a common control logic. When an access address hits in either way of a mirrored pair, a same index portion of the access address is used to initiate a bit comparison of the accessed data in each way of the mirrored pair. Thus single bit error correction and multiple bit error detection can be readily implemented for a predetermined portion of a cache's information while multiple bit error correction is implemented for another portion without introducing substantial complexity into the cache operation.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention. It should be understood that all circuitry described herein may be implemented either in silicon or another semiconductor material or alternatively by software code representation of silicon or another semiconductor material.

Some of the above embodiments, as applicable, may be implemented using a variety of different information processing systems. For example, although FIG. 1 and the discussion thereof describe an exemplary data processing system, this exemplary system is presented merely to provide a useful reference in discussing various aspects of the invention. Of course, the description of the system has been simplified for purposes of discussion, and it is just one of many different types of appropriate systems that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is implemented in any semiconductor independent of the type of semiconductor manufacturing process. Other embodiments may include any type of semiconductor bulk material. Any type of integrated circuit may be used in connection with the storage devices described herein.

Although the invention is described herein with reference to specific embodiments, various modifications and changes can be made without departing from the scope of the present invention as set forth in the claims below. For example, various types of storage devices may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
cache circuitry having a plurality of ways;
mirroring control logic coupled to the cache circuitry, the mirroring control logic indicating a mirrored way pair of the plurality of ways and a non-mirrored way of the plurality of ways, wherein the mirrored way pair comprises a first way and a second way of the plurality of ways, and the second way is configured to store cache data fields redundant to cache data fields of the first way; and
comparison logic which, in response to an access address hitting in the first way or the second way within the mirrored way pair, performs single-bit error detection by performing a bit comparison between cache data from the first way addressed by an index portion of the access address with cache data from the second way addressed by the index portion of the access address to provide a bit parity error signal, and
in response to an access address hitting in the non-mirrored way of the plurality of ways, the data processing system performs multiple-bit error checking.

2. The data processing system of claim 1, wherein the comparison logic, in response to the access address hitting in the first way or the second way within the mirrored way pair, performs a bit comparison between cache data information from the first way addressed by an index portion of the access address with cache data information from the second way addressed by the index portion of the access address to provide the bit parity error signal.

3. The data processing system of claim 2, further comprising:
error control circuitry which, in response to the access address hitting in the first way or the second way within the mirrored way pair, uses protection information from the first way that is associated with the cache data from the first way and is addressed by the index portion of the access address to provide a first error signal which indicates whether a single bit error is present within the cache data from the first way and uses protection information from the second way that is associated with the cache data from the second way and is addressed by the index portion of the access address to provide a second error signal which indicates whether a single bit error is present within the cache data from the second way.

4. The data processing system of claim 3, wherein the mirroring control logic further comprises:
error correction logic coupled to receive the bit parity error signal, the first error signal, and the second error signal, wherein the error correction logic corrects an error within the cache data from the first way or corrects an error within the cache data from the second way based at least in part on the bit parity error signal, the first error signal, and the second error signal.

5. The data processing system of claim 3, further comprising:
output select logic which outputs the cache data from the first way when the first error signal indicates no single bit error is present within the cache data from the first way and outputs the cache data from the second way when the first error signal indicates a single bit error is present within the cache data from the first way.

6. A data processing system comprising:
cache circuitry having a plurality of ways;
mirroring control logic coupled to the cache circuitry, the mirroring control logic indicating a mirrored way pair of the plurality of ways and a non-mirrored way of the plurality of ways, wherein the mirrored way pair comprises a first way and a second way of the plurality of ways, and the second way is configured to store cache data fields redundant to cache data fields of the first way;
comparison logic which, in response to an access address hitting in the first way or the second way within the mirrored way pair, performs a bit comparison between cache data from the first way addressed by an index portion of the access address with cache data from the second way addressed by the index portion of the access address to provide a bit parity error signal; and
an allocation control register which stores allocation information indicating, for each way of the plurality of ways, whether the way is configured to store instruction type information or data type information or both instruction and data type information, wherein the mirroring control logic determines the mirrored way pair of the plurality of ways based at least in part on the allocation information.

7. The data processing systems of claim 6, wherein each way of the mirrored way pair is configured to store data type information.

8. The data processing system of claim 7, wherein the non-mirrored way of the plurality of ways is configured to store at least one type of information selected from a group consisting of instruction type information and read-only data type information.

9. The data processing system of claim 8, further comprising:

error detection logic which, in response to the access address hitting in the non-mirrored way, utilizes cache data and associated protection information from the non-mirrored way that is addressed by the index portion of the access address to provide a first error signal which indicates whether a multiple bit error is present within the cache data from the non-mirrored way, and, in response to the access address hitting in the first way within the mirrored way pair, utilizes the data type information from the first way that is addressed by the index portion of the access address to provide a second error signal which indicates whether a single bit error is present within the cache data from the first way.

10. A data processing system, comprising:
cache circuitry having a plurality of ways;
mirroring control logic coupled to the cache circuitry, the mirroring control logic indicating a set of mirrored way pairs of the plurality of ways and a set of non-mirrored ways of the plurality of ways, wherein each mirrored way pair comprises a first way and a second way of the plurality of ways, the second way configured to store cache data fields redundant to cache data fields of the first way;
allocation logic which, in response to an access address missing in the cache circuitry, using at least a first portion of the access address to determine whether a mirrored way from the set of mirrored way pairs or a non-mirrored way of the set of non-mirrored ways is to be selected for allocation; and
comparison logic which, in response to an access address hitting in the first way or the second way within a mirrored way pair, performs single-bit error detection by performing a bit comparison between cache data from the first way addressed by an index portion of the access address with cache data from the second way addressed by the index portion of the access address to provide a bit parity error signal, and
in response to an access address hitting in the non-mirrored way of the plurality of ways, the data processing system performs multiple-bit error checking.

11. A data processing system, comprising:
cache circuitry having a plurality of ways;
mirroring control logic coupled to the cache circuitry, the mirroring control logic indicating a set of mirrored way pairs of the plurality of ways and a set of non-mirrored ways of the plurality of ways, wherein each mirrored way pair comprises a first way and a second way of the plurality of ways, the second way configured to store cache data fields redundant to cache data fields of the first way; and
allocation logic which, in response to an access address missing in the cache circuitry, using at least a first portion of the access address to determine whether a mirrored way from the set of mirrored way pairs or a non-mirrored way of the set of non-mirrored ways is to be selected for allocation, and wherein the allocation logic further comprises storage circuitry having a plurality of fields, each field associated with a corresponding address value and indicating whether a mirrored way or a non-mirrored way is to be selected for the corresponding address value, and wherein the allocation logic, in response to the access address missing in the cache circuitry, uses the at least a first portion of the access address to determine whether a mirrored way or a non-mirrored way is to be selected by using the at least a first portion of the access address to select a field of the plurality of fields.

12. A data processing system, comprising:
cache circuitry having a plurality of ways;
mirroring control logic coupled to the cache circuitry, the mirroring control logic indicating a set of mirrored way pairs of the plurality of ways and a set of non-mirrored ways of the plurality of ways, wherein each mirrored way pair comprises a first way and a second way of the plurality of ways, the second way configured to store cache data fields redundant to cache data fields of the first way; and
allocation logic which, in response to an access address missing in the cache circuitry, using at least a first portion of the access address to determine whether a mirrored way from the set of mirrored way pairs or a non-mirrored way of the set of non-mirrored ways is to be selected for allocation, and wherein the allocation logic further comprises storage circuitry storing a plurality of rulesets, each ruleset indicating a set of ways of the plurality of ways that are available for replacement, wherein the allocation logic uses at least a second portion of the access address to select a selected ruleset of the plurality of rulesets, and wherein the mirroring control logic indicates the set of mirrored way pairs and the set of non-mirrored ways based on available ways indicated by the selected ruleset.

13. The data processing system of claim 12, wherein the at least a first portion and the at least a second portion are a same portion of the access address.

14. The data processing system of claim 12, wherein each ruleset of the plurality of rulesets corresponds to a predetermined address range, and wherein the allocation logic uses the at least a second portion of the access address to select the selected ruleset by determining which predetermined address range the access address falls into.

15. A data processing system, comprising:
processing circuitry coupled to provide cache commands;
cache circuitry having a plurality of ways, each way comprising a plurality of lines, each line having a corresponding line locking indicator;
mirroring control logic which indicates predetermined pairings of the plurality of ways;
allocation logic, coupled to the processing circuitry, the mirroring control logic, and the cache circuitry, which, in response to a line locking command from the processing circuitry, uses one of the predetermined pairings of the plurality of ways to select a first way of the cache circuitry for allocating a first line of the first way having its corresponding line locking indicator set to indicate the first line is locked and to select a second way, paired with the first way by the one of the predetermined pairings, for allocating a second line of the second way which stores cache data information that is redundant to cache data information of the first line of the first way; and
comparison logic which, in response to an access address hitting in a first way or a second way within a mirrored way pair, performs single-bit error detection by performing a bit comparison between cache data from the first way addressed by an index portion of the access address with cache data from the second way addressed by the index portion of the access address to provide a bit parity error signal, and
in response to an access address hitting in a non-mirrored way of the plurality of ways, the data processing system performs multiple-bit error checking.

16. The data processing system of claim 15, wherein the line locking command has an associated access address, and wherein the first line of the first way is addressed by an index portion of the associated access address and the second line of the second way is also addressed by the index portion of the associated access address.

17. The data processing system of claim 16, wherein the allocation logic, in response to being unable to allocate both the first line of the first way and the second line of the second way, provides an unable to lock indicator in response to the line locking command.

18. The data processing system of claim 15, further comprising storage circuitry which indicates which of the predetermined pairings of the plurality of ways are available for line lock mirroring, wherein the allocation logic uses the predetermined pairings of the plurality of ways which are available for line lock mirroring to select the first way and the second way.

19. A data processing system comprising:
cache circuitry having a plurality of ways, each of the plurality of ways capable of being locked;
storage circuitry for storing way locking control information which, for each of the plurality of ways, indicates whether the way is locked or unlocked;
mirroring control logic coupled to the cache circuitry, the mirroring control logic indicating predetermined pairings of the plurality of ways and whether or not, for each predetermined pairing, way mirroring is enabled, wherein when way mirroring is enabled for a predetermined pairing, each way of a pair of ways within the predetermined pairing being configured to store redundant cache data information;
allocation logic coupled to the mirroring control logic, the storage circuitry, and the cache circuitry, the allocation logic in response to a cache miss, uses the predetermined pairings of the plurality of ways or the way locking control information to select a next available way for allocation; and
comparison logic which, in response to an access address hitting in a first way or a second way within a mirrored way pair, performs single-bit error detection by performing a bit comparison between cache data from the first way addressed by an index portion of the access address with cache data from the second way addressed by the index portion of the access address to provide a bit parity error signal, and
in response to an access address hitting in a non-mirrored way of the plurality of ways, the data processing system performs multiple-bit error checking.

20. The data processing system of claim 19, wherein, in response to the cache miss, the allocation logic uses both the predetermined pairings of the plurality of ways and the way locking control information to select the next available way for allocation and wherein the next available way is a next available non-mirrored and unlocked way.

21. The data processing system of claim 19, wherein the next available way is an unlocked way.

22. The data processing system of claim 21, wherein when the next available way is in a predetermined pairing which has mirroring enabled, the allocation logic also selects a second way for allocation that is paired with the next available way, as indicated by the predetermined pairings.

23. The data processing system of claim 19, wherein each way within the predetermined pairings for which way mirroring is enabled is a locked way.

* * * * *